United States Patent

[11] 3,539,035

| [72] | Inventor | Robert Ignaz Wolkenstein<br>Rethen(Leine), Germany |
|---|---|---|
| [21] | Appl. No. | 745,901 |
| [22] | Filed | July 18, 1968 |
| [45] | Patented | Nov. 10, 1970 |
| [73] | Assignee | Eisenwerk Wulfel<br>Hannover-Wulfel, Germany<br>a German company |
| [32] | Priority | Sept. 19, 1967 |
| [33] | | Germany |
| [31] | | E 34,790 |

[54] LUBRICATING DEVICE FOR PLANETARY GEARING
5 Claims, 2 Drawing Figs.

[52] U.S. Cl. .................................................. 184/66,
74/467, 184/13
[51] Int. Cl. ...................................................... F16n 7/16
[50] Field of Search.......................................... 184/bU,
11B, 13; 74/467, 468

[56] References Cited
UNITED STATES PATENTS

| 2,317,423 | 4/1943 | Vincent...................... | 184/6UX |
| 2,333,161 | 11/1943 | Dunn........................... | 184/6 |
| 2,403,579 | 7/1946 | Carpenter ................... | 184/6 |
| 2,408,336 | 9/1946 | Orr............................... | 184/6 |
| 3,131,582 | 5/1964 | Kelbel.......................... | 74/467X |

FOREIGN PATENTS

| 352,753 | 7/1931 | Great Britain................ | 184/6U |

Primary Examiner—Manuel A. Antonakas
Attorney—Molinare, Allegretti, Newitt and Witcoff ABSTRACT: A lubricating device for planetary gearing wherein a rotating planet pinion carrier has several hollow-bored planet pinion axles. The oil-collector ring of the planet pinion carrier, arranged on a front side and coacting with oil-deflecting ribs provided in the gear cover or gear housing, has a diameter of such size that the axle bores of the planet pinion are covered just enough by the surface of the oil-collector ring to effect efficient lubrication.

INVENTOR.
ROBERT I. WOLKENSTEIN

BY Bair, Freeman
& Molinare
Attys.

3,539,035

LUBRICATING DEVICE FOR PLANETARY GEARING

BACKGROUND OF THE INVENTION

Lubricating devices for planetary gearing are already known. When used for the lubrication of planet-pinion sleeve bearings they are particularly suitable because, within a certain range of revolutions and load range, they eliminate the need for an expensive pressure lubrication arrangement having an oil pump and accessories as well as complicated oil conduits arranged in the gear and in its planet carrier. Due to still imperfect designs, these devices have a number of disadvantages and they no longer meet today's requirements for the development of economical and technically perfect planetary gearing units.

The aforementioned devices are imperfect, especially because they permit only the supply of a limited amount of oil, strictly for the lubrication of the planet-pinion bearings. Therefore, they are not at all suitable to meet today's requirements of high speed gear and small space performances in such a way that the lubricant generates also a removal of heat at the bearings of the planet pinions, which decisively determines the gear function. This results in the disadvantage that the range of revolutions and the load range cannot be increased without difficulty above a medium limit. Moreover, these devices can neither protect adequately the planet-pinion bearings against oil impurities, nor can they assure effective starting lubrication when the flow force is small.

BRIEF SUMMARY OF THE INVENTION

It is the purpose of my invention to create a lubricating device of the aforementioned kind of great progressiveness and extremely simple design which not only permits a considerable increase of the range of rotation and load range by creating the possibility of lubricating and simultaneously cooling the planet-pinion bearings but which also assures the elimination of all other disadvantages described above.

According to my invention this problem is solved by creating a combination of the following new and special features:
  a. Each planet-pinion axle bore is, throughout the entire length of the axle, of the same continuous diameter, which is about half of the axle diameter and into which the oil, supplied by the oil-collector ring, can flow directly and without obstruction at an automatically increasing volume with increase of speed.
  b. On the end of each planet-pinion axle which is opposite from the oil-collector ring, there is arranged a diaphragm which covers only the radially outer half of the planet-pinion axle bore.
  c. Each planet-pinion axle is provided with one or several oil tubes which penetrate the entire axle diameter and each oil tube has within the outer bore half of its planet-pinion axle a transverse bore which has an axis parallel to the planet-pinion axis. The outer edge of the transverse bore is arranged at a certain minimum distance to the wall of the axle bore and the inner edge is arranged at a certain minimum distance to the axis of the axle bore.
  d. Each oil tube opens at its ends into oil grooves provided in the bearing surface of each planet-pinion axle, the oil grooves being located opposite from each other.

Another advantageous development according to my invention results from a dual arrangement of oil-deflecting ribs which effect efficiency of lubrication regardless of the direction of rotation of the planetary gearing.

In the order of the description of the new total combination in a. through d. the following advantages are attained with my invention:
  1. Since only a relatively small amount of oil is needed for lubrication of the planet-pinion bearings, the increased amount of oil which is supplied when the number of revolutions increases flows through the planet-pinion axle bores, designed according to feature a., and in this manner is mainly used for attaining the desired necessary cooling effect.
  2. The feature b. assures that, when a larger amount of oil is needed at a higher rate of revolutions, the outer half of each planet-pinion axle bore will never run without oil but will always have available a sufficiently large quantity of oil for efficient lubrication of the respective planet-pinion bearings.
  3. Because of the arrangement of the oil tubes and the position of their transverse bores according to feature c. not only the flow of oil into these tubes is assured even at a high rate of speed but the bearing surfaces are also protected against oil impurities, since any dirt particles which might be forced to the wall of the planet-pinion axle bore due to their higher density cannot enter the oil tubes. Moreover, it is assured that the oil tubes reliably retain a sufficiently large amount of oil for a new start, even after a prolonged shutdown of the gearing unit, and also that in gearing units running at very low speeds the oil tubes can fill themselves each time they pass the gear oil sump. Since each oil tube penetrates the entire diameter of the respective planet-pinion axle and, according to feature d., communicates with oil grooves located opposite from each other, the oil can flow radially to the outer or inner oil groove. Therefore, the change of direction of the flow of force and thus the change of position of the suction zone between bearing bore and bearing axle is also taken into consideration. Consequently, my lubricating device can be used for a very wide range of rotating speed, and
  4. The aforementioned oil grooves according to feature d. form also in an advantageous manner a double oil reservoir for the starting condition since the complete drainage of the lubricant trapped in the oil-collector ring is eliminated due to capillary action, even during a prolonged shutdown.

Finally, when compared with the already known arrangements of oil-deflector ribs, the development of the dual oil-deflecting ribs of my lubricating device is advantageous because it makes possible a particularly favorable reversal of the oil flow in the oil-collector ring which is effective for both directions of rotation due to the featured staggered position of the ribs to the left and right.

Without mentioning again all these advantages in all details an embodiment of my invention is herebelow explained with reference to the accompanying drawing wherein:

DESCRIPTION OF THE PREFERRED EMBODIMENT

Figure 1:
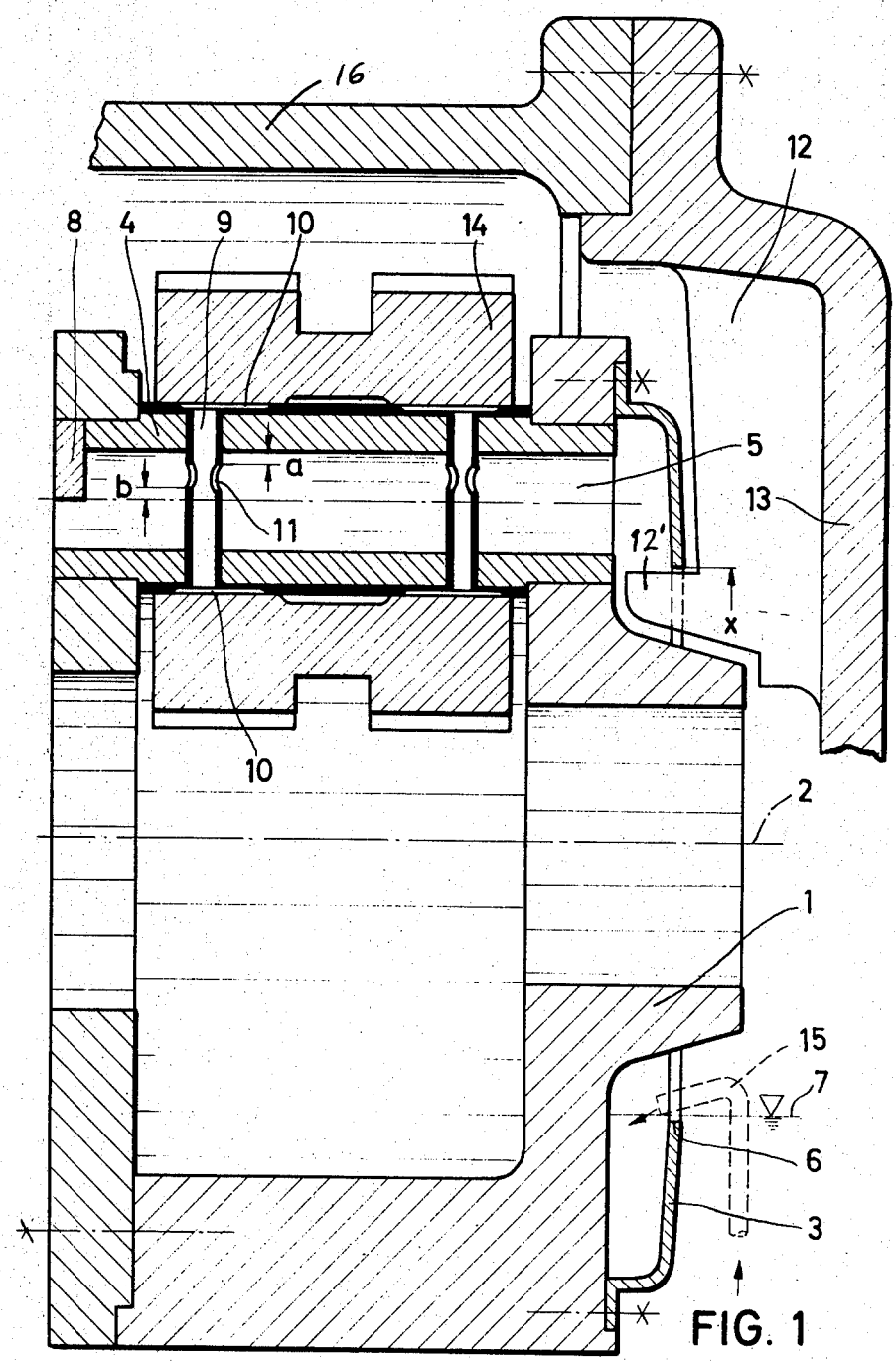
FIG. 1 is a sectional view of a planet-pinion carrier and my lubricating device associated therewith.

On a front side of a planet-pinion carrier 1 (the right hand side in FIG. 1), whose axis 2 is identical with the main axis of the internal gear (not shown here) of a planetary gearing unit, there is an oil-collector ring 3, known as such. A planet-pinion axle 4 has a concentrically arranged bore 5 which extends throughout the entire length of the axle 4 and which has the same continuous width of about half of the axle diameter. The inside diameter "x" of the oil-collector ring 3 is dimensioned in such a way that the planet-pinion axle bores 5 are covered just enough by the surface of the oil-collector ring 3, and the lowest spot 6 of its inside diameter "x" is located below the oil level 7 of the oil sump, the planetary gearing being arranged to rotate on a horizontal axis. It is to be understood that a plurality of the axles 4 are carried by the carrier 1 in the manner illustrated in FIG. 1, and are circumferentially spaced from each other around the carrier, each having rotatable thereon a planetary pinion 14.

On the end of each planet-pinion axle 4 located opposite from the oil-collector ring 3 there is arranged a diaphragm 8 which covers only the radially outer half of its planet-pinion axle bore 5, and each axle 4 is provided with one or several oil tubes 9 which penetrate the entire axle diameter. Each oil tube 9 is in communication at its radially inner and outer ends with oil grooves 10 arranged in the bearing surface of each planet-pinion axle 4 and located opposite from each other. Each oil tube 9 is provided with a transverse bore 11 which is parallel to the axle 4. The transverse bore is arranged within the outer half of the bore 5 of each planet-pinion axle 4 in such a manner that the outer edge of each transverse bore 11 is at a minimum distance "a" from the wall of the axle bore and its inner edge is at a minimum distance "b" from the center of the axle bore.

Figure 2:
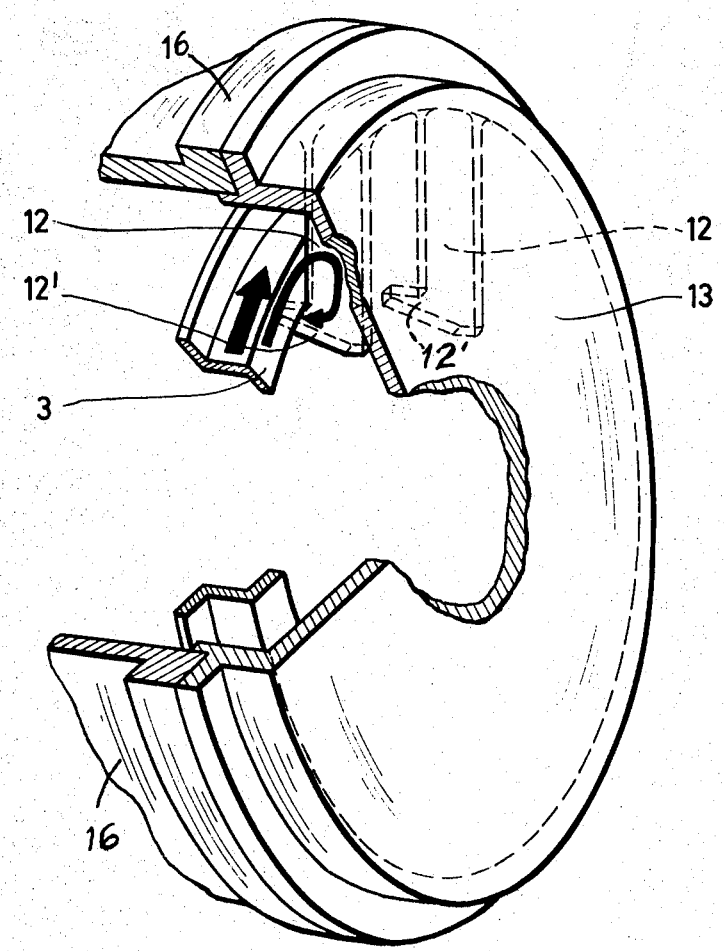
FIG. 2 is a perspective partial section of the exemplified arrangement of the oil-deflector ribs of my device.

As especially shown in FIG. 2, the oil-collector ring 3 coacts with oil-deflector ribs 12, preferably arranged in pairs and formed as projections from a gear housing cover 13 in such manner that in lieu of one radial oil-deflector rib there is provided two oil-deflector ribs 12 staggered from a radial line to the left and right of such line. This makes possible a particularly favorable reversal of the oil flow in the oil-collector ring 3, irrespective of the existing direction of rotation. Consequently, when the planet-pinion carrier 1 rotates together with the oil, which is taken along by adhesion, in a gear housing 16, for instance in the direction of the heavy arrow in FIG. 2, the oil is dammed up to a certain degree at the left oil-deflector rib 12 of the illustrated pair of ribs, depending on the respective rate of revolution, and deflected through the shovel-shaped extension 12' thereof in the direction of the lighter arrow into the oil-collector ring 3. From there the oil flows, at a volume which increases with the higher rate of revolution, without further obstruction into the bores 5 of the axles 4 which carry the planet pinions 14. The greater part of the oil not used for lubrication flows through these wide bores 5 and assures in this way an excellent cooling of each planet-pinion bearing, especially at higher rates of revolution.

In addition to this cooling action, the lubricating device according to my invention is particularly ingenious in that, as mentioned before, the diaphragm 8 of each planet-pinion axle bore 5 prevents oil outflow from the outer half of the axle bore, especially at higher rates of revolution. The arrangement and development of the oil tubes 9, together with their oil grooves 10 which are located opposite from each other, and the special location of their transverse bores 11 assure in this way the realization of the advantages described in detail hereinbefore. The fact that the oil grooves 10 as such are a valuable double oil reservoir for the starting condition of the gear has also already been explained.

The herein disclosed lubricating device offers also the possibility of further expanding the range of revolutions, particularly upward, if the lubricating oil is injected without special pressure into the oil-collector ring 3, for instance through a line 15 instead of using the oil-deflector ribs 12 which are no longer effective at higher rates of revolution. The centrifugal force then takes over the function of moving the oil.

If the planetary gearing unit is to be arranged for instance with a vertical axis, it will be necessary to arrange the oil-collector ring 3 on the lower front side of the planet-pinion carrier 1 so that the oil-deflector ribs 12 can be eliminated. In this arrangement, the effect of the centrifugal force generates an oil pressure within the oil-collector ring which is now completely below the oil level. The equation is $$h = \frac{r^2 w^2}{2g}$$

wherein $h$ is the pressure head, $g$ is the acceleration due to gravity, $r$ is the oil-collector ring radius and $w$ is the angular velocity. The effect of this oil pressure is that the lubricating oil rises in the hollow-bored planet-pinion axle 4 above the level of the oil sump and reaches the points of lubrication again through the oil tubes 9. For inclined gears, depending on the rate of revolution and the degree of inclination of the axis of the planetary gearing unit, either the last-mentioned arrangement is applicable, or the arrangement of the oil-collector ring and oil-collector ribs suitable for the horizontal arrangement.

I claim:
1. A lubricating device for planetary gearing which has a rotating planet-pinion carrier which carries a hollow-bored, planet-pinion axle arranged adjacent to an oil groove and which further carries an oil-collector ring coacting with an oil-deflecting rib and a supply of oil provided in a gear housing for said unit, said ring having a diameter of such a size that the axle bore of the planet-pinion is substantially covered by the surface of the oil-collector ring characterized by the combination of the following features:
   a. said planet-pinion axle bore extending throughout the length of the axle and into which the oil, supplied by the oil-collector ring, can flow directly and without obstruction at an automatically increasing volume in proportion to speed increase;
   b. on the end of said planet-pinion axle which is opposite said oil-collector ring there is arranged a diaphragm which covers only the radially outer path of the planet-pinion axle bore; and
   c. each planet-pinion axle is provided with an oil tube which penetrates the entire axle diameter and which communicates with said oil groove, said oil tube having within the outer half of the bore of its planet-pinion axle a transverse bore.

2. A lubricating device according to claim 1 characterized in that the outer edge of said transverse bore is arranged at a certain minimum distance to the wall of the axle bore and the inner edge thereof is arranged at a certain minimum distance to the bore axis.

3. A lubricating device according to claim 1 characterized in that said oil tube opens at only one of its ends into said oil groove provided in the bearing surface of said planet-pinion axle.

4. A lubricating device according to claim 3 characterized in that there is a second oil groove in the bearing surface of said planet-pinion axle which is located opposite the first groove therein and said oil tube opens at its other end into said second groove.

5. A lubricating device according to claim 1 characterized in that the oil-deflecting rib coacts with the oil-collector ring and is plural in character, two of the ribs being staggered from a radial line of the planetary gearing unit in such a way that, in lieu of a deflecting rib along a radial line in the center, there is provided one rib laterally staggered to the left and the other to the right of such radial line.